G. F. GRUND.

Improvement in Baling Presses.

No. 125,454. Patented April 9, 1872.

Witnesses:
E. Wolff
Geo. W. Mabee

Inventor:
G. F. Grund
per
Attorneys.

UNITED STATES PATENT OFFICE.

GEORGE F. GRUND, OF FREMONT, OHIO.

IMPROVEMENT IN BALING-PRESSES.

Specification forming part of Letters Patent No. 125,454, dated April 9, 1872.

Specification describing a new and Improved Press, invented by GEORGE F. GRUND, of Fremont, in the county of Sandusky and State of Ohio.

My invention consists in the arrangement of two presses horizontally in two different parallel planes, with a long lever between, connected to the follower of each, on opposite sides of its pivot, in such manner as to produce a double-acting apparatus, by which two bales of hay are pressed at one time, whereby I economize by saving the time and some of the labor lost with a single press in withdrawing the followers. The invention also consists of an arrangement of the press-door-fastening devices.

Figure 1:
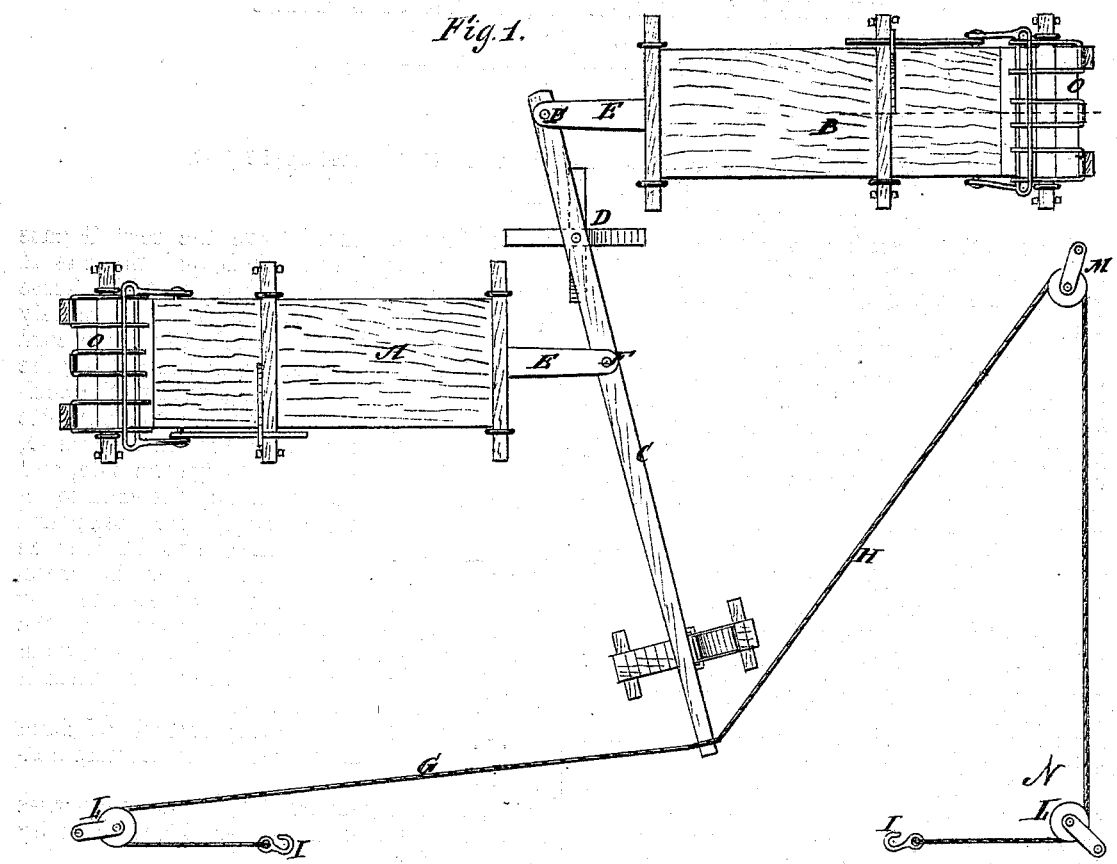
Figure 2:
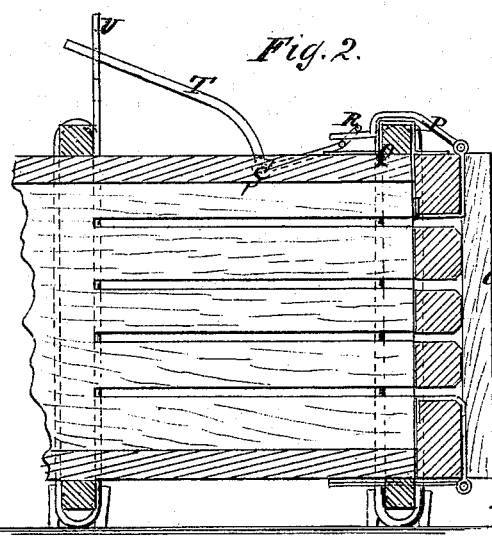

Figure 1 is a plan view of two presses, showing my double-acting arrangement; and Fig. 2 is a section of one of the press-cases, showing the door-fastening apparatus.

Similar letters of reference indicate corresponding parts.

A and B represent the press-cases, which are arranged horizontally on any suitable floor or platform, with the lever C for operating the followers pivoted between the ends, the cases not being in the same line, and the ends not quite coming to the line of the axis or pivot D, at right angles to the cases. E represents the rods or bars which connect the followers to said line, being pivoted to it at F. The lever may be operated in any approved way; but, in this example, I have represented the cords G and H with hooks I, by which to hitch a horse to pull the lever; and in order to save the walking of the horse back from the place of stopping after one operation to another place for the next, I have the cord G pass through the pulley-block L, and the one H through blocks M and N, so that the horse works between the blocks L and N, merely turning around when unhitched from one cord to be hitched on the other, and in pulling the lever in one direction going back to the position for being hitched to pull in the opposite direction. For fastening the end doors O, which are opened to discharge the bale, and are required to be very firmly fastened to resist the action of the follower, I provide several hooks, P, which, being hinged to the door, as shown, are adapted to hook over the cross-piece Q; and I secure them by the slotted bar R, pivoted at S, and arranged to swing on the straight ends of the hooks, and hold them, when forced against them, by the lever T, which is held by the notched bar V.

Having thus described my invention, I claim as new and desire to secure by Letters Patent—

1. The arrangement of the two press-cases A B and one operating-lever, C, substantially as specified.

2. The arrangement of the cords G H and pulley-blocks with the lever, substantially as specified.

3. The hooks P, cross-bar Q, slotted bar R, lever T, notched bar V, the press-door, and case, all combined substantially as specified.

GEORGE F. GRUND.

Witnesses:
GEO. R. CAMPBELL,
JOHN G. SPICHER.